UNITED STATES PATENT OFFICE 2,286,349

PREPARATION OF SOLUTIONS OF CYANAMIDE IN LIQUID AMMONIA

Harold S. Davis, Greenwich, Conn., assignor to American Cyanamid Company, New York, N. Y., a corporation of Maine No Drawing. Application July 25, 1941, Serial No. 403,997

5 Claims. (Cl. 23—190)

The present invention relates to a method of producing free cyanamide and is based upon the fact that while free cyanamide is soluble in liquid ammonia, the alkaline earth metal cyanamides and other salts thereof are insoluble therein. Consequently, free cyanamide may be formed in liquid ammonia by reacting an alkaline earth metal cyanamide with an ammonium salt having an acid radical which forms a liquid ammonia insoluble alkaline earth metal salt. The ammonium salt may be added as such or formed in the liquid ammonia. As a result, the free cyanamide dissolves in the liquid ammonia and the insoluble alkaline earth metal salt precipitates, thus making separation simple.

Free cyanamide in liquid ammonia is a valuable intermediate, particularly for the preparation of melamine, which may be obtained by heating the liquid ammonia solution of free cyanamide under pressure.

Again, this solution of cyanamide may be used as a reaction medium for the production of other substances from cyanamide, and the free cyanamide, after release from the solid metallic cyanamide, can under some conditions react with an excess of the ammonium salt to form valuable products. Dicyandiamide may be readily formed by simple evaporation of the liquid ammonia menstruum from the dissolved free cyanamide.

The invention, therefore, in one of its broader aspects, contemplates the production of a liquid ammonia solution of free cyanamide by reacting in liquid ammonia an alkaline earth metal cyanamide with an ammonium salt having an acid radical which forms a liquid ammonia insoluble alkaline earth metal salt. Obviously, the greater the insolubility of the precipitated salt relative to that of the original alkaline earth metal cyanamide, the greater will be the yield of free cyanamide.

The liquid ammonia need not be completely anhydrous inasmuch as in general water increases the rate of reaction. However, a quantity of water should not be used which will dissolve an appreciable amount of the final alkaline earth metal salt for otherwise separation thereof from the reacting menstruum is made more difficult and the free cyanamide solution is contaminated therewith.

After the reaction is finished, the solids are separated by any desired method. At this time, any impurities in the crude alkaline earth metal cyanamide as well as the excess thereof goes out with the filter cake. This cake can be again treated by the process to release and extract more free cyanamide, and the resulting solution of cyanamide in liquid ammonia can be used in the process instead of pure liquid ammonia for reaction with fresh alkaline earth metal cyanamide.

Generally speaking, the reaction takes place preferably at the boiling point of liquid ammonia and under atmospheric pressures. Where ammonia recovery and recycling is desired, a closed system at higher temperatures may be used with the attendant necessary pressures.

The following alkaline earth metal salts being typical of those insoluble in liquid ammonia, it will be seen that the corresponding ammonium salt may be used to react with the alkaline earth metal cyanamide with consequent formation of free cyanamide in liquid ammonia solution and precipitation of the below mentioned compounds:

Calcium bromide
Calcium carbamate
Calcium carbonate
Calcium chloride
Calcium perchlorate
Calcium iodide
Calcium sulfide
Calcium acetate
Calcium butyrate
Barium carbonate
Barium chloride
Barium iodide
Barium sulfide
Barium acetate
Strontium bromide
Strontium carbonate
Strontium chloride
Strontium iodide
Strontium sulfide
Magnesium bromide
Magnesium carbonate
Magnesium chloride
Magnesium perchlorate
Magnesium sulfide It is to be understood that the above list is not intended to be exclusive but is representative only.

On the other hand, ammonium nitrate and ammonium thiocyanate are unsuitable for the reaction because the corresponding alkaline earth metal salts are very soluble in liquid ammonia.

The preferred material for carrying out the reaction is crude commercial calcium cyanamide which contains, in addition to that compound, such impurities as lime and carbon. However, inasmuch as those impurities are insoluble in liquid ammonia, they may be readily separated from the final solution by filtration with the insoluble calcium salt.

Perhaps the preferred ammonium salts to be used in the reaction are the carbamate, carbonate or sulfide, these materials being chosen because of their cheapness and availability.

While the invention has been described with particular reference to specific embodiments, it is to be understood that it is not to be limited thereto but is to be construed broadly and restricted solely by the scope of the appended claims.

I claim:
1. A method of producing free cyanamide which includes the steps of reacting in liquid ammonia an alkaline earth metal cyanamide with an ammonium salt having an acid radical which forms a liquid ammonia-insoluble alkaline earth metal salt.

2. A method of producing free cyanamide which includes the steps of reacting in liquid ammonia an alkaline earth metal cyanamide with an inorganic ammonium salt having an acid radical which forms a liquid ammonia-insoluble alkaline earth metal salt.

3. The method of claim 1 in which the alkaline earth metal cyanamide is used in excess of that necessary to combine with all of the ammonium salt.

4. The method of claim 1 in which the insolubles are then separated from the free cyanamide solution.

5. A method of producing free cyanamide which includes the steps of reacting in liquid ammonia, calcium cyanamide and an ammonium salt having an acid radical which forms a liquid ammonia-insoluble calcium salt.

HAROLD S. DAVIS.